United States Patent
Niergarth et al.

(10) Patent No.: US 11,261,792 B2
(45) Date of Patent: Mar. 1, 2022

(54) THERMAL MANAGEMENT SYSTEM WITH THERMAL BUS FOR A GAS TURBINE ENGINE OR AIRCRAFT

(71) Applicant: General Electric Company, Schenectady, NY (US)

(72) Inventors: Daniel Alan Niergarth, Norwood, OH (US); Brandon Wayne Miller, Liberty Township, OH (US); Justin Paul Smith, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 88 days.

(21) Appl. No.: 16/685,490

(22) Filed: Nov. 15, 2019

(65) Prior Publication Data
US 2021/0148283 A1 May 20, 2021

(51) Int. Cl.
*F02C 7/16* (2006.01)

(52) U.S. Cl.
CPC .......... *F02C 7/16* (2013.01); *F05D 2260/213* (2013.01)

(58) Field of Classification Search
CPC ...... F02C 6/08; F02C 9/18; F02C 7/12; F02C 7/141; F02C 7/224; F02C 7/16; B64D 13/06; B64D 13/08; F28F 27/02; F05D 2220/50; F25B 25/005; F25B 7/00; F25B 31/026; F25B 2400/072; F28D 2021/0021
See application file for complete search history.

(56) References Cited

U.S. PATENT DOCUMENTS

| | | | |
|---|---|---|---|
| 6,460,353 B2 | 10/2002 | Udobot et al. | |
| 7,000,425 B2 | 2/2006 | Army, Jr. et al. | |
| 7,478,525 B2 * | 1/2009 | Iya | F02K 1/822 60/204 |
| 7,980,293 B2 | 7/2011 | Jensen | |
| 8,424,285 B2 * | 4/2013 | Veilleux, Jr. | F02C 7/12 60/39.83 |
| 8,499,822 B2 * | 8/2013 | Bulin | F02C 7/224 165/51 |
| 9,429,072 B2 * | 8/2016 | Diaz | F02C 7/047 |

(Continued)

FOREIGN PATENT DOCUMENTS

EP 3249334 A1 11/2017

OTHER PUBLICATIONS

U.S. Appl. No. 16/178,898, filed Nov. 2, 2018.
U.S. Appl. No. 16/011,748, filed Jun. 19, 2018.

*Primary Examiner* — Craig Kim
(74) *Attorney, Agent, or Firm* — Dority & Manning, P.A.

(57) ABSTRACT

A thermal management system is provided for incorporation into at least one of a gas turbine engine or an aircraft. The thermal management system includes: a thermal transport bus having a heat exchange fluid flowing therethrough, the thermal transport bus further including: a first flow loop comprising at least one first heat source exchanger, at least one first heat sink exchanger, and a first pump to move the heat exchange fluid through the first flow loop; and a second flow loop comprising at least one second heat source exchanger, at least one second heat sink exchanger, and a second pump to move the heat exchange fluid through the second flow loop; wherein the first flow loop is isolated from the second flow loop, and wherein the first heat source exchanger and the second heat source exchanger are configured with a common heat source.

19 Claims, 6 Drawing Sheets

(56) References Cited

U.S. PATENT DOCUMENTS

| | | |
|---|---|---|
| 9,561,856 B2 | 2/2017 | Mevenkamp et al. |
| 10,260,419 B2 | 4/2019 | Cerny et al. |
| 10,612,860 B2 * | 4/2020 | Ribarov .................... F28F 3/08 |
| 2006/0162371 A1 * | 7/2006 | Lui ........................ F25B 9/004 |
| | | 62/402 |
| 2015/0083378 A1 | 3/2015 | Banach |
| 2016/0131036 A1 * | 5/2016 | Bintz .................... F01D 25/162 |
| | | 60/779 |
| 2016/0290235 A1 * | 10/2016 | Ekanayake ............... F02C 7/18 |
| 2017/0030266 A1 * | 2/2017 | Cerny .................... F02C 7/185 |
| 2017/0081040 A1 | 3/2017 | Pal |
| 2017/0122206 A1 * | 5/2017 | Niergarth .................. F02C 7/14 |
| 2017/0167382 A1 | 6/2017 | Miller et al. |
| 2017/0217592 A1 * | 8/2017 | Hinderliter ............... F02C 3/04 |
| 2018/0038654 A1 | 2/2018 | Popp et al. |
| 2018/0050811 A1 * | 2/2018 | Niergarth ............... B64D 33/08 |
| 2019/0153952 A1 | 5/2019 | Niergarth et al. |
| 2019/0153953 A1 * | 5/2019 | Niergarth .................. F02C 7/14 |
| 2019/0218971 A1 | 7/2019 | Niergarth et al. |

\* cited by examiner

THERMAL MANAGEMENT SYSTEM WITH THERMAL BUS FOR A GAS TURBINE ENGINE OR AIRCRAFT

FIELD

The present subject matter relates generally to an integrated cooling system for a gas turbine engine and/or an aircraft.

BACKGROUND

A gas turbine engine generally includes a fan and a core arranged in flow communication with one another. Various accessory systems are included to ensure that the fan and/or core operate as desired. For example, a main lubrication system provides lubrication to, e.g., bearings and gear meshes within a compressor section, a turbine section, and a power gear box (if provided). In addition to the lubricating properties provided to such components, the main lubrication system removes heat from such components such that they may operate within a desired temperature range.

Other accessory systems of the gas turbine engine, such as an environmental control system, also require heat removal during operation.

Accordingly, gas turbine engines typically include numerous heat exchangers, wherein each heat exchanger is dedicated to an individual accessory system of the gas turbine engine. At least certain of these individual accessory systems of the gas turbine engine require a maximum heat removal at potentially different stages of the gas turbine engine run cycle. However, as the heat exchangers are dedicated to an individual system, each heat exchanger must be sized to accommodate the maximum heat removal required for the respective accessory system. Such a configuration may result in an inefficient use of the heat exchangers. For example, such a configuration may result in certain heat exchangers operating at maximum capacity, while other heat exchangers are operated at a nominal capacity (or not at all).

To address the above situation, U.S. Pat. No. 10,260,419 describes a thermal management system for incorporation into a gas turbine engine or an aircraft, the system including a thermal transport bus having a heat exchange fluid flowing therethrough and a pump for generating a flow of the heat exchange fluid in the thermal transport bus. A plurality of heat source exchangers are configured in the thermal transport bus, wherein the heat exchange fluid removes heat from the heat exchangers. A heat sink exchanger is also configured in the thermal transport bus downstream from the heat source exchangers to remove heat from the heat exchange fluid.

The thermal management system described in the U.S. '419 patent may be referred to as a "single loop" system in that the heat source exchangers and one or more heat sink exchangers are configured essentially in series in a single pass loop configuration. It is also known to use multiple heat source exchangers configured in parallel for a single heat source within the single loop system.

A potential risk of the single loop systems, however, is that a single-point failure in the loop can result in a shutdown of the entire system. For example, a leak or rupture in the primary side (heat exchange fluid side) of the system in one of the heat source or heat sink exchangers, or in the fluid path between the heat source and heat sink exchangers, may result in a system shutdown.

Accordingly, a fault-tolerant thermal management cooling system for a gas turbine engine having built-in redundancies would be particularly useful in the industry.

BRIEF DESCRIPTION

Aspects and advantages of the invention will be set forth in part in the following description, or may be obvious from the description, or may be learned through practice of the invention.

In one exemplary embodiment of the present disclosure, a thermal management system is provided for incorporation into at least one of a gas turbine engine or an aircraft. The thermal management system includes: a thermal transport bus having a heat exchange fluid flowing therethrough, the thermal transport bus further including: a first flow loop comprising at least one first heat source exchanger, at least one first heat sink exchanger, and a first pump to move the heat exchange fluid through the first flow loop; and a second flow loop comprising at least one second heat source exchanger, at least one second heat sink exchanger, and a second pump to move the heat exchange fluid through the second flow loop; wherein the first flow loop is isolated from the second flow loop, and wherein the first heat source exchanger and the second heat source exchanger are configured with a common heat source.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
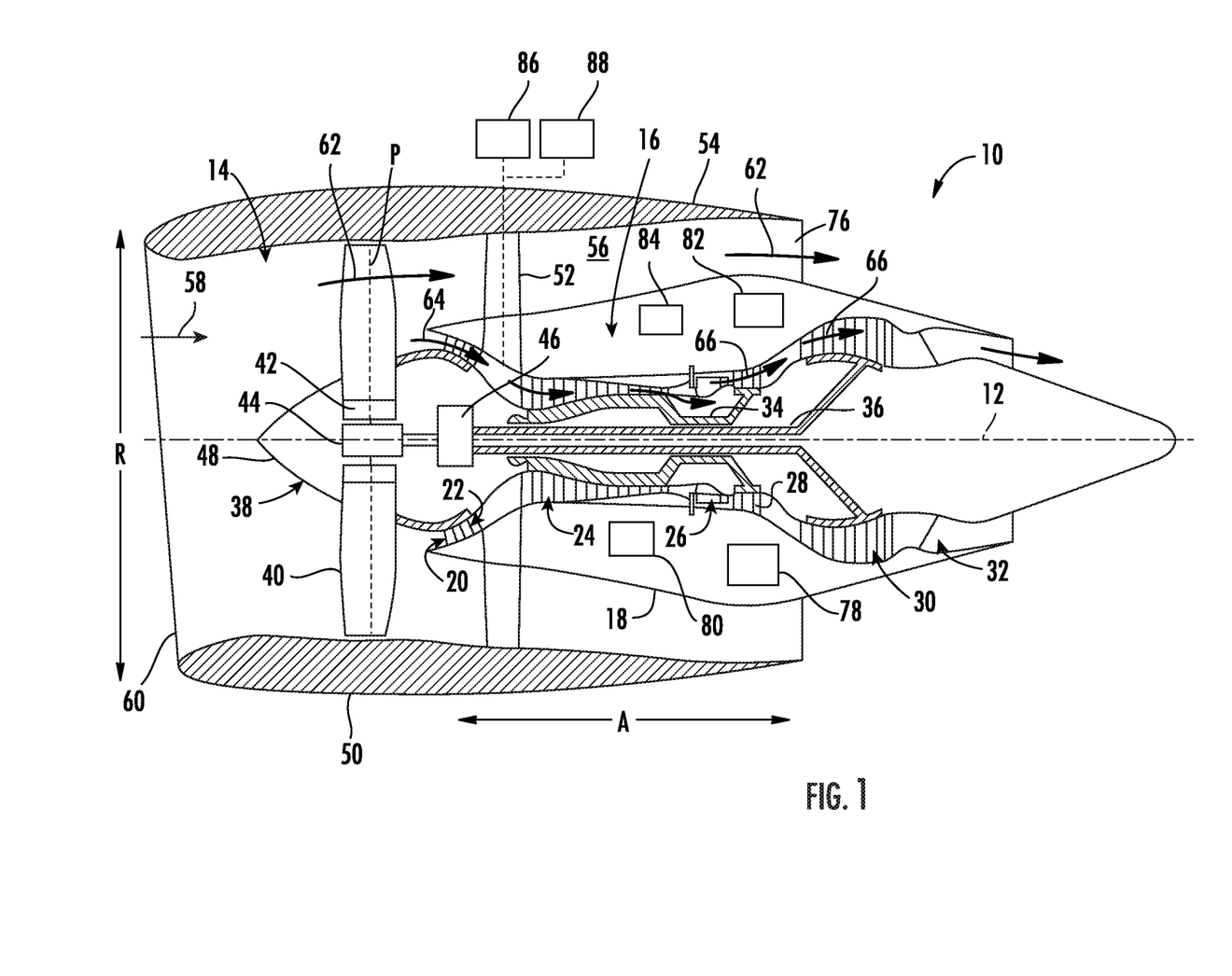
FIG. 1 is a schematic, cross-sectional view of an exemplary gas turbine engine according to various embodiments of the present subject matter.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 (designated by arrows 62) is directed or routed into the bypass airflow passage 56 and a second portion of the air 58 (designated by arrow 64) is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Moreover, as is depicted schematically, the exemplary turbofan engine 10 further includes various accessory systems to aid in the operation of the turbofan engine 10 and/or an aircraft including the turbofan engine 10. For example, the exemplary turbofan engine 10 further includes a main lubrication system 78 (indicated schematically in FIG. 1) configured to provide a lubricant to, e.g., various bearings and gear meshes in the compressor section (including the LP compressor 22 and HP compressor 24), the turbine section (including the HP turbine 28 and the LP turbine 30), the HP spool 34, the LP spool 36, and the power gear box 46. The lubricant provided by the main lubrication system 78 may increase the useful life of such components and may remove a certain amount of heat from such components. Additionally, the turbofan engine 10 includes a compressor cooling air (CCA) system 80 for providing air from one or both of the HP compressor 24 or LP compressor 22 to one or both of the HP turbine 28 or LP turbine 30. Moreover, the exemplary turbofan engine 10 includes an active thermal clearance control (ACC) system 82 for cooling a casing of the turbine section to maintain a clearance between the various turbine rotor blades and the turbine casing within a desired range throughout various engine operating conditions. Furthermore, the exemplary turbofan engine 10 includes a electric machine thermal system 84 for providing thermal management benefits to an electric machine, such as cooling/heat removal for the electric machine. The electric machine thermal system 84 may be part of a electric machine lubrication oil system, or may be a dedicated thermal system for the electric machine. The electric machine may be an electronic generator for providing electrical power to, e.g., a startup electric motor for the turbofan engine 10 and/or various other electronic components of the turbofan engine 10 and/or an aircraft including the turbofan engine 10.

As is also depicted schematically, the exemplary turbofan engine 10 drives or enables various other accessory systems for an aircraft including the exemplary turbofan engine 10. For example, the exemplary turbofan engine 10 provides compressed air from the compressor section to an environmental control system (ECS) 86. The ECS 86 may provide an air supply to a cabin of the aircraft for pressurization and thermal control. Additionally, air may be provided from the exemplary turbofan engine 10 to an electronics cooling system 88 for maintaining a temperature of certain electronic components of the turbofan engine 10 and/or aircraft within a desired range.

Prior turbofan engines 10 included individual heat exchangers for each of these accessory systems to remove heat from air and/or lubrication in such systems. However, aspects of the present disclosure include a thermal management system 100 (see FIG. 2) for transferring heat from some or all of such accessory systems to more efficiently remove such heat.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may instead be any other suitable aeronautical gas turbine engine, such as a turbojet engine, turboshaft engine, turboprop engine, etc. Additionally, in still other exemplary embodiments, the exemplary turbofan engine 10 may include or be operably connected to any other suitable accessory systems. Additionally, or alternatively, the exemplary turbofan engine 10 may not include or be operably connected to one or more of the accessory systems discussed above.

Figure 2:
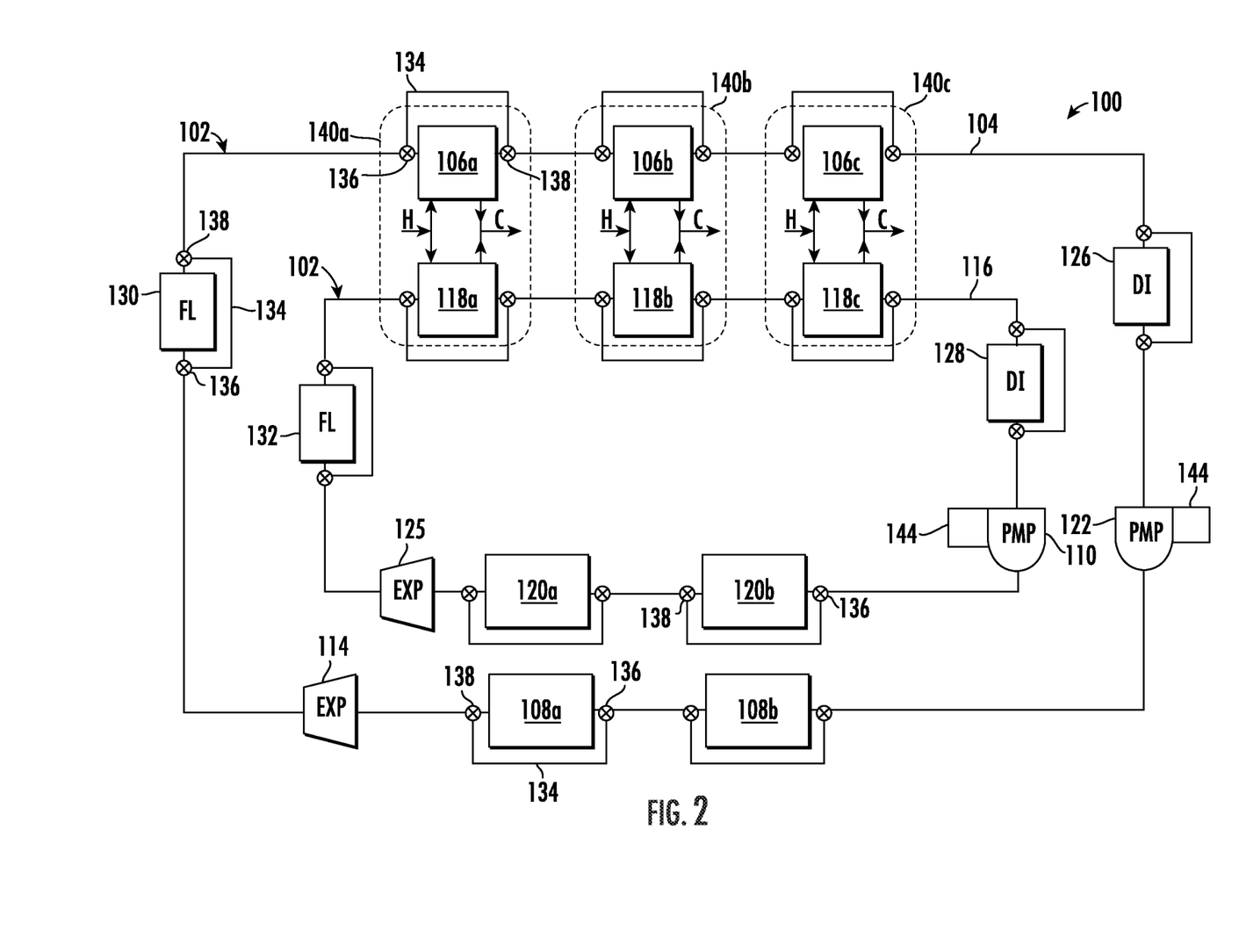
FIG. 2 is a schematic view of an embodiment of a thermal management system in accordance with the present disclosure.

Referring now to FIG. 2, a schematic, flow diagram is provided of a thermal management system 100 in accordance with an exemplary embodiment of the present disclosure for incorporation at least partially into the exemplary turbofan engine 10 of FIG. 1.

As shown, the thermal management system 100 generally includes a thermal transport bus 102. The thermal transport bus 102 includes an intermediary heat exchange fluid flowing therethrough and may be formed of one or more suitable fluid conduits. The heat exchange fluid may be an incompressible fluid having a high temperature operating range. For example, in certain embodiments, the heat exchange fluid may be a liquid such as a water and ethanol mixture, or any suitable dielectric fluid. In other embodiments, however, the heat exchange fluid may be any other suitable fluid, such as an oil having a relatively high temperature operating range, a phase change fluid (configured to change between, e.g., liquid and gas phases across the anticipated operating temperature ranges), a supercritical heat exchange fluid (such as a supercritical CO2), etc.

Referring still to FIG. 2, the thermal transport bus 102 includes a first flow loop 104, which further includes at least one first heat source exchanger 106a-c, at least one first heat sink exchanger 108a-b, and a first pump 110 to move the heat exchange fluid through the first flow loop 104.

The thermal transport bus 102 also includes a second flow loop 116, which further includes at least one second heat source exchanger 118a-c, at least one second heat sink exchanger 120a-b, and a second pump 122 to move the heat exchange fluid through the second flow loop 116. The pumps 110 (first flow loop 104) and 122 (second flow loop 116) generate a closed-loop flow of the heat exchange fluid in the thermal transport bus 102 within their respective flow loop. The pumps 110, 122 may be a rotary pump including an impeller, or alternatively may be any other suitable fluid pump. Additionally, the pumps 110, 122 may be powered by an electric motor, or alternatively may be in mechanical communication with and powered by, e.g., the HP shaft 34 or the LP shaft 36 of the turbofan engine 10.

As depicted in FIG. 2, the first heat source exchanger 106a and the second heat source exchanger 118a are configured with a common heat source 140a such that each of the first heat source exchanger 106a and the second heat source exchanger 118a provide independent and isolated heat removal capability (via the heat exchange fluid) to the same common heat source 140a. The common heat source 140a may be, for example, a main lubrication system heat exchanger for transferring heat from the main lubrication system 78; a CCA system heat source exchanger for transferring heat from the CCA system 80; an ACC system heat source exchanger for transferring heat from the ACC system 82; a generator lubrication system heat source exchanger for transferring heat from the electric machine thermal system 84; an ECS heat exchanger for transferring heat from the ECS 86; and an electronics cooling system heat exchanger for transferring heat from the electronics cooling system 88.

The thermal transport bus 102 may include any number of first and second heat source exchangers configured with respective common heat sources. For example, in the illustrated embodiment, an additional first heat source exchanger 106b and additional second heat source exchanger 118b provide independent and isolated heat removal capability to the same common heat source 140b. Likewise, another first heat source exchanger 106c and another second heat source exchanger 118c provide independent and isolated heat removal capability to the same common heat source 140c.

The first flow loop 104 is isolated from the second flow loop 116 such that the heat exchange fluid moving through the first flow loop 104 does not mix with the heat exchange fluid moving through the second flow loop 116. For example, although the first heat source exchanger 106a and the second heat source exchanger 118a are configured to remove heat from the same common heat source 140a, the heat source exchangers 106a and 118a are structurally independent and fluidly isolated such that the heat exchange fluid moving through the respective heat source exchangers 106a and 118a does not mix.

In the depicted embodiment, the first heat source exchanger 106a-c and second heat source exchanger 118a-c configured with a respective one of the common heat sources 140a-c are arranged in parallel. The hot medium (labeled "H" in the figures) splits and flows through the heat exchangers in parallel, and subsequently combines into a single cold medium flow (labeled "C" in the figures). Particularly for the embodiment shown, the common heat source 140a includes an output/bleed port 141a and in input port 143a. The bleed port 141a is configured to provide a flow of hot fluid to the first heat source exchanger 106a and the second heat source exchanger 118a in parallel, and the input port 143a is configured to receive cooled fluid from the first heat source exchanger 106a and the second heat source exchanger 118a.

It will be appreciated, however, that in an alternate embodiment, the first and second heat source exchangers 106a-c and 118a-c could be arranged in series with each of the common heat sources 140a-c.

As depicted in FIG. 2, it may be desired to configure each of the heat source exchangers 106a-c and 118a-c with a respective bypass line 134 and upstream 136 and downstream 138 isolation valves. This provides the system 100 with the capability to isolate one of the two heat source exchangers configured with each of the common heat sources 140a-c in the event of a failure (e.g., leak or rupture). For example, if the first heat source exchanger 106a fails, it can be isolated and bypassed within the first flow loop 104 leaving the second heat source exchanger 118a to provide heat removal capability to the common heat source 140a. For this, the upstream isolation valves 136 may be a three-way heat sink valve with an inlet fluidly connected with the thermal transport bus 102, a first outlet fluidly connected with the thermal transport bus 102, and a second outlet fluidly connected with the bypass line 134.

Likewise, if the second heat source exchanger 118c fails, it can be isolated and bypassed within the second flow loop 116 leaving the first heat source exchanger 106c to provide heat removal capability to the common heat source 140c.

The first flow loop 104 and second flow loop 116 each include one or more dedicated heat sink exchangers 108a-b and 120a-b, respectively, located downstream of the plurality of heat source exchangers 106a-c and 118a-c for transferring heat from the heat exchange fluid in the thermal transport bus 102, e.g., to atmosphere, to fuel, to a fan stream, etc. For example, in certain embodiments, the heat sink exchangers 108a-b and 120a-b may include at least one of a RAM heat exchanger, a fuel heat exchanger, a fan stream heat exchanger, or a bleed air heat exchanger. The RAM heat exchanger may be configured as an "air to heat exchange fluid" heat exchanger integrated into one or both of the turbofan engine 10 or an aircraft including the turbofan engine 10. During operation, the RAM heat exchanger may remove heat from any heat exchange fluid therein by flowing a certain amount of RAM air over the RAM heat exchanger. Additionally, the fuel heat exchanger is a "liquid to heat exchange fluid" heat exchanger wherein heat from the heat exchange fluid is transferred to a stream of liquid fuel for the turbofan engine 10. Moreover, the fan stream heat exchanger is generally an "air to heat exchange fluid" heat exchanger which flows, e.g., bypass air over heat exchange fluid to remove heat from the heat exchange fluid. Further, the bleed air heat exchanger is generally an "air to heat exchange fluid" heat exchanger which flows, e.g., bleed air from the LP compressor over heat exchange fluid to remove heat from the heat exchange fluid.

For the embodiment of FIG. 2, the multiple heat sink exchangers 120a-b and 108a-b are configured in series within their respective flow loop 116, 104. In other embodiments, two or more of the heat sink exchangers 108a-b and 120a-b may be arranged in parallel flow within their respective flow loop 104, 116.

As can be readily appreciated from FIG. 2, the heat exchange fluid flowing through the first heat sink exchangers 108a-b in the first flow loop 104 does not mix with the heat exchange fluid flowing through the second heat sink exchangers 120a-b in the second flow loop 116.

Thus, with the above thermal management system 100 in accordance with the embodiment of FIG. 2, it is readily appreciated that the first flow loop 104 and the second flow loop 116 provide redundant and isolated heat removal capacity to the plurality of common heat sources 140a-c.

Still referring to the embodiment of FIG. 2, the plurality of heat sink exchangers 108a-b in the first flow loop 104, and the plurality of heat sink exchangers 120a-b in the second flow loop 116, may be configured for selective activation of any combination thereof within their respective flow loop. For this, each of the heat sink exchangers 108a-b and 120a-b may be provided with a bypass line 134 and upstream 136 and downstream 138 isolation valves. In a particular embodiment, the upstream isolation valves 136 may be a three-way heat sink valve with an inlet fluidly connected with the thermal transport bus 102, a first outlet fluidly connected with the thermal transport bus 102, and a second outlet fluidly connected with the bypass line 134. The three-way heat sink valves 136 may each be a variable throughput three-way valve, such that the three-way heat sink valves 136 may vary a throughput from the inlet to the first and/or second outlets. For example, the three-way heat sink valves 136 may be configured for providing anywhere between zero percent (0%) and one hundred percent (100%) of the heat exchange fluid from the inlet to the first outlet, and similarly, the three-way heat sink valves 136 may be configured for providing anywhere between zero percent (0%) and one hundred percent (100%) of the heat exchange fluid from the inlet to the second outlet.

It will be appreciated that although the exemplary embodiment depicted in FIG. 2 includes the valves 136, 138 for bypassing the respective first and second heat source exchangers 106a-c, 118a-c and heat sink exchangers 120a-b, 108a-b, in other embodiments the gas turbine engine and/or thermal management system 100 may have any other suitable configuration for bypassing one or more of these heat exchangers. For example, in other embodiments, the heat source and/or heat sink system may be configured to bypass the heat exchangers of the thermal management system. For example, when fuel is the heat sink thermally coupled to one of the heat sink exchangers 120a-b, 108a-b, the fuel may be bypassed around the respective heat sink exchangers 120a-b, 108a-b with which it is otherwise fluidly coupled. Similarly for example, when a lubrication oil system is a heat source thermally coupled to one of the heat source exchangers 106a-c, 118a-c, the lubrication oil may be bypassed around the respective heat source exchangers 106a-c, 118a-c with which it is otherwise fluidly coupled. In such a manner, it may be possible to adjust heat source systems and/or heat sink systems of the aircraft engine to ensure aircraft safety, while still allowing for desired operations of the thermal management system 100. For example, it may be possible to shut downs a bleed port flow (which may be a heat sink system with respect to the thermal management system 100) and de-rate the gas turbine engine in the event of a malfunctioning heat source pipe. Such may provide for a more simple approach to bypassing heat exchangers when it is determined to be necessary or desirable.

Notably, the three-way heat sink valves 136 may be in operable communication with a controller of the turbofan engine 10 and/or of an aircraft including the turbofan engine 10. The controller may bypass one or more of the heat sink exchangers 108a-b in first flow loop 104 and the heat sink exchangers 120a-b in the second flow loop 116 based on, e.g., an operating condition of the turbofan engine 10 and/or aircraft, a temperature of the heat exchange fluid, and/or any other suitable variables.

The thermal management system 100 of FIG. 2 may more efficiently remove heat from the various accessory systems of the turbofan engine 10 and/or the aircraft. For example, the various accessory systems may generate a varying amount of heat dependent on various operating conditions of the turbofan engine 10 and/or the aircraft. However, not all of the accessory systems define the same heat pattern (i.e., not all of the accessory systems heat up and cool down at the same time). For example, the main lubrication system 78 may require a maximum amount of heat removal during high load conditions of the turbofan engine 10. By contrast, however, the ECS 86 may require a max amount of heat removal during high-altitude flight. Accordingly, by integrating the heat removal for the variety of different accessory systems, fewer heat exchangers may be required to remove a desired amount of heat and/or smaller heat exchangers may be required to remove a desired amount of heat.

Moreover, heat may be removed from the various accessory systems in a more efficient manner. For example, when a relatively low amount of heat is required to be removed from the heat exchange fluid, the most efficient one of the heat sink exchangers 108a-b in the first flow loop 104 may be utilized and the others bypassed. The same applies to the heat sink exchangers 120a-b in the second flow loop 116.

However, when a relatively high amount of heat is required to be removed from the heat exchange fluid, the additional heat sink exchangers 108a-b and 120a-b may also be utilized. Notably, such a configuration may allow for utilization of a fuel heat exchanger without risk of heating the fuel to a point where de-oxygenation systems are required to be included. For example, prior fuel heat exchangers run the risk of fuel coking or deposit formation within the fuel system when a temperature of the fuel is increased past a predetermined threshold (thus requiring the de-oxygenation systems). Due to the redundant and selective configuration of the various heat sink exchangers 108a-b and 120a-b for the embodiment depicted, however, utilization of the fuel heat exchanger may be ceased prior to the fuel reaching such a predetermined threshold.

The thermal management system 100 may additionally be configured to heat oil, for example, when operating in cold conditions or when starting the aircraft and/or engine. For example, in certain exemplary embodiments, the thermal management system 100 may bypass any combination of the heat sink exchangers 108a-b and 120a-b such that heat from one of the heat source exchangers 106a-c and 118a-c may be used to heat oil from a different one of the heat sources. For example, heat from one of the heat source exchangers 106a-c may be used to heat lubrication oil from the main lubrication system 78 to allow for a proper lubrication oil viscosity in a power gearbox 46.

Referring still to FIG. 2, the exemplary thermal management system 100 may utilize a refrigeration cycle to more efficiently remove heat from the various heat source exchangers 106a-c and 118a-c within the flow loops 104 and 116. Specifically, the pump 110 of the first flow loop 104 may be configured as a first compressor for compressing a gaseous heat exchange fluid, and the first flow loop 104 may further include a first expansion device 114 for expanding the heat exchange fluid in the first flow loop 104. Similarly, the pump 122 of the second flow loop 116 may be configured as a second compressor, and the second flow loop 116 may further include a second expansion device 125. The pumps/compressors 110 and 122 are at a location downstream of the heat source exchangers 106a-c and 118a-c and upstream of the heat sink exchangers 108a-b and 120a-b within their respective flow loop. The expansion devices 114 and 125 are at a location downstream of the heat sink exchangers 108a-b and 120a-b and upstream of the heat source exchangers 106a-c and 118a-c within their respective flow loop. The pumps/compressors 110 and 122 are each powered by a respective drive system 144. For example, the pumps/compressors 110 and 122 may be driven by, e.g., an electric motor, or alternatively may be in mechanical communication with and driven by a rotary component of the turbofan engine 10, such as the HP shaft 34 or the LP shaft 36. Although separate drive systems 144 are depicted, in other embodiments, a single, combined drive system 144 (such as a single electric motor) may be used for both pumps/compressors 110 and 122.

With this configuration, the sink exchangers 108a-b and 120a-b act as condensers, and the plurality of heat source exchangers 106a-c and 118a-c act as evaporators, which may provide for more efficient heat removal from the various heat source exchangers and heat transfer to the heat sink exchangers 108a-b and 120a-b. In certain exemplary embodiments, the expansion devices 114, 125 may be utilized as a power generating device configured to generate rotational power from a flow of heat exchange fluid therethrough.

Still referring to the embodiment of FIG. 2, the exemplary thermal management system 100 may include features for de-icing certain components of an aircraft. Specifically, one or each of the flow loops 104, 116 may include a de-icing module 126, 128, respectively, at a location downstream of the plurality of heat source exchangers and upstream of the heat sink exchangers with the flow loop. The de-icing modules 126, 128 may be configured to utilize heat from the heat exchange fluid in the thermal transport bus 102 to warm components of the aircraft susceptible to icing. Depending on, e.g., the aircraft and atmospheric conditions, ice may be prone to forming on the fuselage of the aircraft, the wings of the aircraft, etc. Accordingly, in certain embodiments, the de-icing modules 126, 128 may include one or more fluid lines (not shown) mounted in thermal communication with a surface of e.g., the fuselage of the aircraft, the wings of the aircraft, etc. When utilized, the fluid lines of the de-icing modules 126, 128 may provide a flow of the heat exchange fluid in the thermal transport bus 102 therethrough, or alternatively, may have a separate de-icing fluid that transfers heat from the heat exchange fluid using, e.g., a de-icing heat exchanger (not shown).

As with the various components discussed above, the thermal management system 100 may include a bypass line and associated valves for selectively bypassing or variably actuating the de-icing modules 126, 128.

Furthermore, one or each of the flow loops 104, 116 may include a fuel chiller 130, 132, respectively, at a location upstream of the plurality of heat source exchangers 106a-c and 118a-c and downstream of the heat sink exchangers 108a-b, 120a-b. The fuel chillers 130, 132 may be configured to remove heat from the fuel of the turbofan engine 10 to assist with maintaining the fuel within a desired temperature range. As with various other components of the thermal management system 100 of FIG. 2, bypass lines and isolation valves may be provided with the fuel chillers 130, 132.

A thermal management system in accordance with an exemplary embodiment present disclosure may allow for a gas turbine engine and aircraft including such a gas turbine engine to operate more efficiently. More particularly, inclusion of a thermal management system in accordance with an exemplary embodiment of the present disclosure may allow for a reduction in volume of a core of the gas turbine engine as fewer heat exchangers and/or smaller heat exchangers may be required to maintain a desired amount of heat removal. Additionally, the heat removed using a thermal management system in accordance with an exemplary embodiment of the present disclosure may allow for redirection of such heat to one or more accessory systems that require heat to operate.

Figure 3:
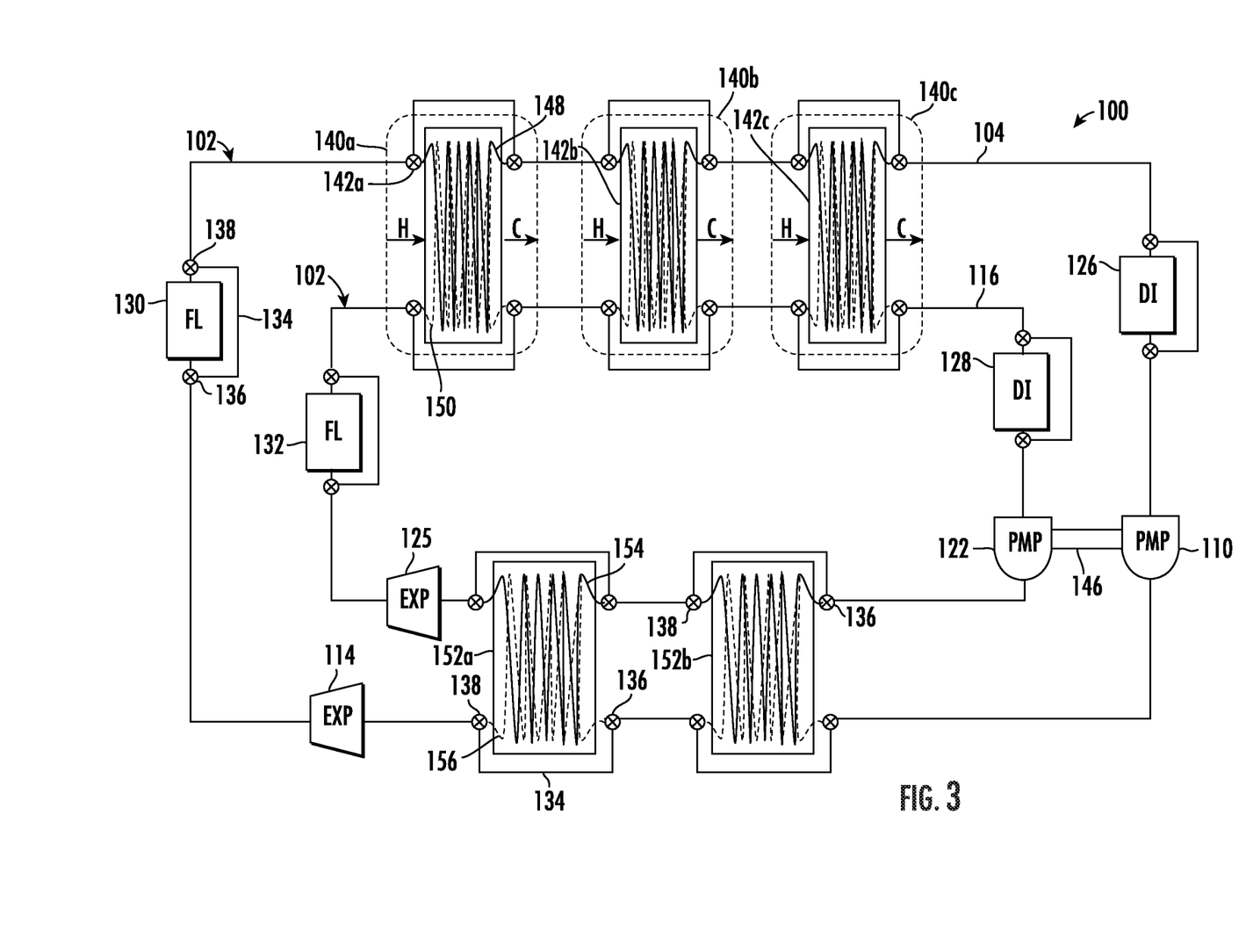
FIG. 3 is a schematic view of another embodiment of a thermal management system in accordance with the present disclosure.

Referring now to FIG. 3, a thermal management system 100 in accordance with another exemplary embodiment of the present disclosure is provided. The exemplary thermal management system 100 depicted schematically in FIG. 3 may be configured in substantially the same manner as the exemplary thermal management system 100 described above with reference to FIG. 2. Like numerals have been used in FIG. 3 to identify the same or similar components as the thermal management system 100 of FIG. 2.

In the embodiment of FIG. 3, wherein the first heat source exchanger for the first flow loop 104 and the second heat source exchanger for the second flow loop 116 share a common heat source exchanger structure 142a-c instead of physically separate structures as in the embodiment of FIG. 2. For example, the common heat source exchanger structures 142a-c may be configured with a common heat exchanger shell through which the heated medium (H) from the heat sources 140a-c flow. The shell may be a rigid casing enclosing the heat exchanger structure, or formed integrally with the heat exchanger structure. Within the common heat source exchanger structure 142a-c, each of the flow loops 104, 116 has a set of dedicated and physically separate tubes such that the first and second flow loops 104, 116 are structurally isolated within the common heat source exchanger structure 142a-c. For example, the first flow loop 104 includes tubes 148 (solid lines) within the structure 142a, and the second flow loop includes tubes 150 (dashed lines) within the structure 142a. Each of the tube sets 148, 150 may include bypass lines and isolation valves, as depicted in FIG. 3, for the purposes discussed above. This embodiment may be desirable in that the number of actual heat exchangers and complexity of the system 100 is reduced as compared to the embodiment of FIG. 2.

Still referring to the embodiment of FIG. 3, the first heat sink exchanger for the first flow loop 104 and the second heat sink exchanger for the second flow loop 116 may share a common heat sink exchanger structure 152a-b instead of the physically separate structures as in the embodiment of FIG. 2. For example, the common heat sink exchanger structures 152a-b may be configured with a common heat exchanger shell through a cooling medium flows. Within the common heat sink exchanger structure 152a-b, each of the flow loops 104, 116 has a set of dedicated and physically separate tubes such that the first and second flow loops 104, 116 are structurally isolated within the common heat sink exchanger structure 152a-b. For example, the first flow loop 104 includes tubes 154 (solid lines) within the common structure 152a, and the second flow loop includes tubes 156 (dashed lines) within the common structure 152a. Each of the tube sets 154, 156 may include bypass lines and isolation valves, as depicted in FIG. 3, for the purposes discussed above. This embodiment may be desirable in that the number of actual heat exchangers and complexity of the system 100 is reduced as compared to the embodiment of FIG. 2.

FIG. 3 also depicts that, in a certain embodiment, the first compressor 112 in the first flow loop 104 and the second compressor 124 in the second flow loop 116 are driven by a common drive 146 instead of the separated drives as depicted in the embodiment of FIG. 2. This configuration may also reduce the cost and complexity of the overall thermal management system 100

Figure 4:
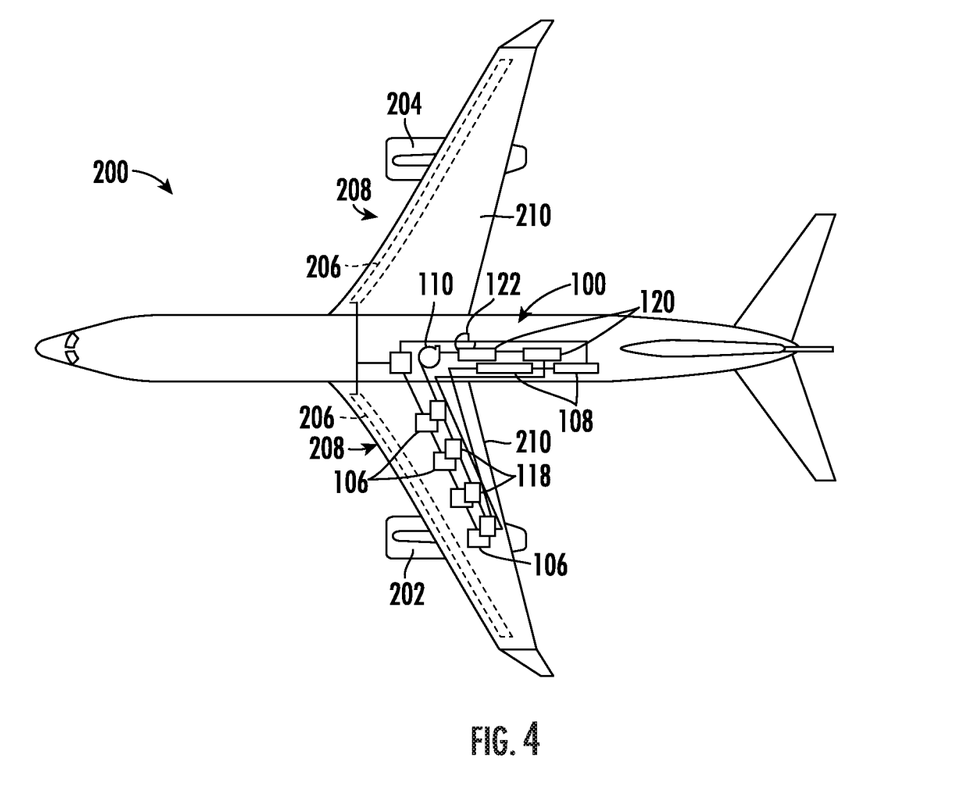
FIG. 4 is a simplified view of an aircraft incorporating an embodiment of a thermal management system in accordance with the present disclosure.

For the embodiment of FIG. 4, the thermal management system 100 is incorporated into an aircraft 200 and at least partially into a gas turbine engine. Specifically, the thermal management system 100 is incorporated into the aircraft 200 and a first turbofan engine 202 and/or a second turbofan engine 204. The first and second turbofan engines 202, 204 may each be configured in substantially the same manner as the exemplary turbofan engine 10 described above with reference to FIG.

Additionally, as is depicted, the exemplary thermal management system 100 of FIG. 4 includes a thermal transport bus according to any one or combination of the thermal transport busses 102 discussed above with reference to FIGS. 1 and 2. The exemplary thermal management system 100 may be integrated into both the aircraft 200 and the turbofan engine 202. For example, in the exemplary embodiment of FIG. 3, one or more of the first heat source exchangers 106 and second heat source exchangers 118 may be located in the turbofan engine 202 and one or more of the first heat source exchangers 106 and second heat source exchangers 118 may be located in the aircraft 200. Similarly, one or more of the heat sink exchangers 108 and second heat sink exchangers 120 may be located in the turbofan engine 202 and one or more of the first heat sink exchangers 108 and second heat sink exchangers 120 may be located in the aircraft 200.

Additionally, other elements of the exemplary thermal management systems 100 discussed above may be positioned at any suitable location within the aircraft 200. For example, the thermal management system 100 of FIG. 4 may include a de-icing module in one or both of the flow loops having thermal lines 206 (depicted in phantom) for heating certain components of the aircraft 200, for example to prevent or remedy icing conditions on, e.g., a forward edge 208 of a wing 210 of the aircraft 200.

Figure 5:
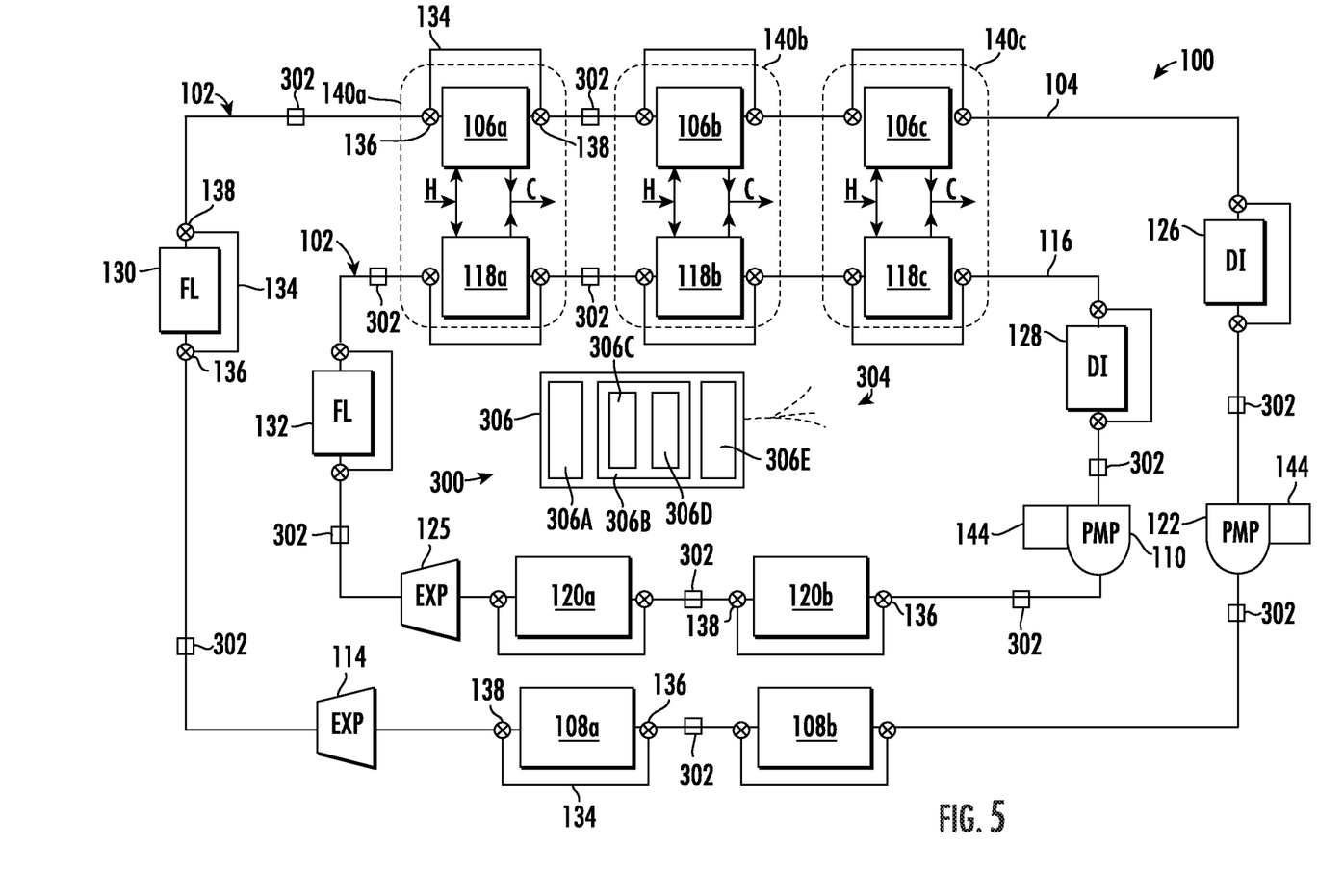
FIG. 5 is a schematic view of yet another embodiment of a thermal management system in accordance with the present disclosure.

Further, referring now to FIG. 5, a thermal management system 100 in accordance with yet another exemplary embodiment of the present disclosure is provided. The exemplary thermal management system 100 depicted schematically in FIG. 5 may be configured in substantially the same manner as the exemplary thermal management systems 100 described above with reference to FIGS. 2 and 3. Like numerals have been used in FIG. 5 to identify the same or similar components as the thermal management systems 100 of FIGS. 2 and 3.

In the embodiment of FIG. 5, the thermal management system 100 further includes a control system 300 operable with various aspects of the thermal management system. In particular, it will be appreciated that the control system 300 depicted includes a plurality of sensors 302. The plurality of sensors 302 may include a plurality of pressure sensors, temperature sensors, flowrate sensors, etc. For the embodiment shown, the plurality of sensors 302 are operable with the first flow loop 104 upstream of the first heat sink exchanger 108a and downstream of the first heat source exchanger 106a for sensing data indicative of the heat exchange fluid through the first flow loop 104 as such locations. Further for the embodiment shown, the plurality of sensors 302 are operable with the second flow loop 116 upstream of the second heat sink exchanger 120a and downstream of the second heat source exchanger 118a for sensing data indicative of the heat exchange fluid through the first flow loop 104 as such locations. Although not depicted, similar sensors 302 may be operable with the first and second flow loops 104, 116 upstream and downstream of any other heat source exchangers 106, 118, any heat sink exchangers 108, 120, any pumps or expansion devices, etc. Further, the plurality of sensors 302 may be stand-alone sensors 302 for sensing data indicative of one or more operational parameters within the first and/or second flow loops 104, 116.

As noted, the exemplary control system 300 includes the controller 304. The controller is configured to receive the data sensed from the one or more sensors 302 and, e.g., may make control decisions for the thermal management system 100 based on the received data.

In one or more exemplary embodiments, the controller 304 depicted in FIG. 5 may be a stand-alone controller for the thermal management system 100, or alternatively, may be integrated into one or more of a controller for the gas turbine engine with which the thermal management system 100 is integrated, a controller for an aircraft including the gas turbine engine with which the thermal management system 100 is integrated, etc.

Referring particularly to the operation of the controller 304, in at least certain embodiments, the controller 304 can include one or more computing device(s) 306. The computing device(s) 306 can include one or more processor(s) 306A and one or more memory device(s) 306B. The one or more processor(s) 306A can include any suitable processing device, such as a microprocessor, microcontroller, integrated circuit, logic device, and/or other suitable processing device. The one or more memory device(s) 306B can include one or more computer-readable media, including, but not limited to, non-transitory computer-readable media, RAM, ROM, hard drives, flash drives, and/or other memory devices.

The one or more memory device(s) 306B can store information accessible by the one or more processor(s) 306A, including computer-readable instructions 306C that can be executed by the one or more processor(s) 306A. The instructions 306C can be any set of instructions that when executed by the one or more processor(s) 306A, cause the one or more processor(s) 306A to perform operations. In some embodiments, the instructions 306C can be executed by the one or more processor(s) 306A to cause the one or more processor(s) 306A to perform operations, such as any of the operations and functions for which the controller 304 and/or the computing device(s) 306 are configured, the operations for operating a thermal management system 100 (e.g, method 400), as described herein, and/or any other operations or functions of the one or more computing device(s) 306. The instructions 306C can be software written in any suitable programming language or can be implemented in hardware. Additionally, and/or alternatively, the instructions 306C can be executed in logically and/or virtually separate threads on processor(s) 306A. The memory device(s) 306B can further store data 306D that can be accessed by the processor(s) 306A. For example, the data 306D can include data indicative of power flows, data indicative of engine/aircraft operating conditions, and/or any other data and/or information described herein.

The computing device(s) 306 can also include a network interface 306E used to communicate, for example, with the other components of the thermal management system 100, the gas turbine engine incorporating thermal management system 100, the aircraft incorporating the gas turbine engine, etc. For example, in the embodiment depicted, as noted above, the gas turbine engine and/or thermal management system 100 includes one or more sensors 302 for sensing data indicative of one or more parameters of the gas turbine engine, the thermal management system 100, or both. The controller 304 the thermal management system 100 is operably coupled to the one or more sensors 302 through, e.g., the network interface, such that the controller 304 may receive data indicative of various operating parameters sensed by the one or more sensors 302 during operation. Further, for the embodiment shown the controller 304 is operably coupled to, e.g., the various bypass valves of the thermal management system 100 in response to, e.g., the data sensed by the one or more sensors 302.

The network interface 306E can include any suitable components for interfacing with one or more network(s), including for example, transmitters, receivers, ports, controllers, antennas, and/or other suitable components. For example, the controller 304 may be operably connected to the sensors 302 through the network interface 306E through a wired or wireless (indicated in phantom) communications network.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

In such a manner, it will be appreciated that in at least certain exemplary embodiments, the control system 300 may make control decisions based on data received from the one or more sensors 302 indicative of one or more operating parameters of the thermal management system 100. For example, in at least certain exemplary embodiments, the control system 300 may control the thermal management system 100 in accordance with one or more of the exemplary aspects described below with reference to FIG. 6.

Figure 6:
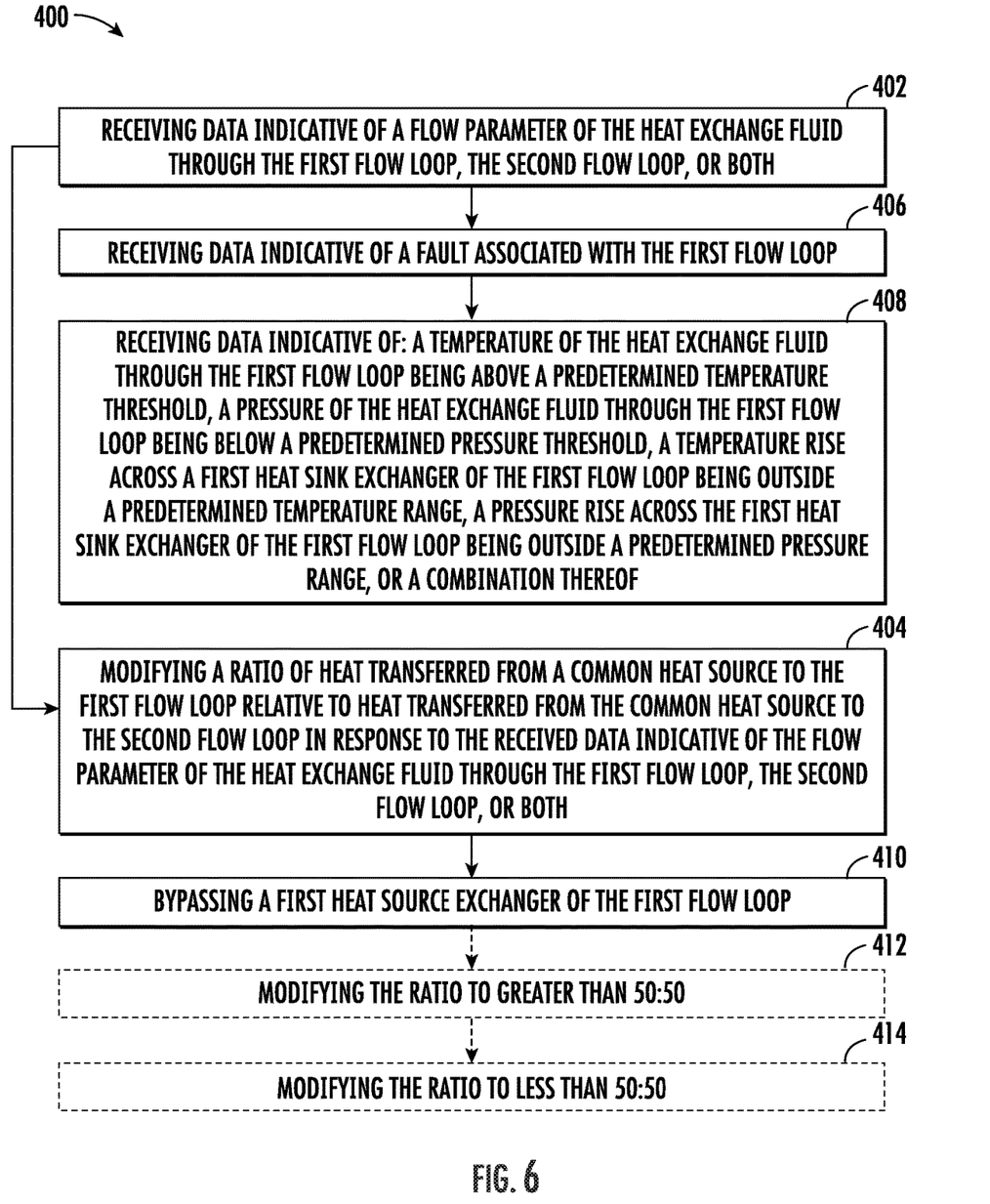
FIG. 6 is a flow diagram of a method of operating a thermal management system of a gas turbine engine in accordance with an exemplary aspect of the present disclosure.

Referring now to FIG. 6, a flow diagram of a method 400 for operating a thermal management system of a gas turbine engine is provided. The method 400 may be utilized with one or more of the thermal management systems described above. Accordingly, the thermal management system may generally include a thermal transport bus having a first flow loop, a second flow loop, and a heat exchange fluid flowing therethrough.

As is depicted, the method 400 generally includes at (402) receiving data indicative of a flow parameter of the heat exchange fluid through the first flow loop, the second flow loop, or both. The data received may be through a control system, such as through one or more sensors operable with the thermal management system. For example, the sensors may sense data indicative of one or more of a temperature, a pressure, a flowrate, etc. of the heat exchange fluid through the first and/or second flow loop.

The method 400 further includes at (404) modifying a ratio of heat transferred from a common heat source to the first flow loop relative to heat transferred from the common heat source to the second flow loop in response to the received data indicative of the flow parameter of the heat exchange fluid through the first flow loop, the second flow loop, or both.

For example, in the exemplary embodiment depicted, receiving data indicative of the flow parameter of the heat exchange fluid through the first flow loop, the second flow loop, or both at (402) includes at (406) receiving data indicative of a fault associated with the first flow loop. For the exemplary aspect depicted, receiving data indicative of the fault associated with the first flow loop at (406) includes at (408) receiving data indicative of: a temperature of the heat exchange fluid through the first flow loop being above a predetermined temperature threshold, a pressure of the heat exchange fluid through the first flow loop being below a predetermined pressure threshold, a temperature rise across a first heat sink exchanger of the first flow loop being outside a predetermined temperature range, a pressure rise across the first heat sink exchanger of the first flow loop being outside a predetermined pressure range, or a combination thereof. For example, when the temperature and/or pressure of the heat exchange fluid through the first flow loop is above a respective predetermined threshold, such may indicate that the first flow loop is not properly rejecting the heat transferred to the heat exchange fluid therein, that a respective heat sink is not operating properly, that the first flow loop is accepting more heat than it has capacity for, etc.

Referring still to the method 400 of FIG. 6, it will further be appreciated that modifying the ratio of heat transferred from the common heat source to the first flow loop relative to heat transferred from the common heat source to the second flow loop at (404) includes at (410) bypassing a first heat source exchanger of the first flow loop. In certain exemplary aspects, modifying the ratio of heat transferred from the common heat source to the first flow loop relative to heat transferred from the common heat source to the second flow loop at (404) may further include at (412) modifying the ratio to greater than 50:50 (heat to first flow loop to heat to second flow loop), greater than 60:40, greater than 75:25, or greater than 90:10. Alternatively, modifying the ratio of heat transferred from the common heat source to the first flow loop relative to heat transferred from the common heat source to the second flow loop at (404) may further include at (414) modifying the ratio to less than 50:50 (heat to first flow loop to heat to second flow loop), less than 40:60, less than 25:75, or less than 10:90. In such a manner, the method 400 may adapt to overcome or accommodate any faults or operability limitations within the thermal management system.

It will be appreciated, that although the method 400 is described with respect to the first flow loop, in other exemplary aspects, the same or similar control steps may be taken with the second flow loop. Further, although the method 400 discusses controlling the ratio of heat transfer between the first and second flow loops by actuating bypass valves for the various heat source exchangers and heat sink exchangers, in other exemplary embodiments, the method 400 may additionally or alternatively modify operation of one or more other components, such as one or more pumps, compressors, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A thermal management system for incorporation into at least one of a gas turbine engine or an aircraft, including: a thermal transport bus having a heat exchange fluid flowing therethrough, the thermal transport bus further including: a first flow loop comprising at least one first heat source exchanger, at least one first heat sink exchanger, and a first pump to move the heat exchange fluid through the first flow loop; and a second flow loop comprising at least one second heat source exchanger, at least one second heat sink exchanger, and a second pump to move the heat exchange fluid through the second flow loop; wherein the first flow loop is isolated from the second flow loop, and wherein the first heat source exchanger and the second heat source exchanger are configured with a common heat source.

The thermal management system of any preceding clause, wherein the heat exchange fluid moving through the first flow loop does not mix with the heat exchange fluid moving through the second flow loop, and wherein the first flow loop and the second flow loop provide redundant and isolated heat removal capacity to the common heat source.

The thermal management system of any preceding clause, wherein the first heat source exchanger and the second heat source exchanger are physically separate heat exchangers configured in parallel with the common heat source.

The thermal management system of any preceding clause, wherein the common heat source comprises a bleed port fluidly coupled to one of the at least one first heat source exchanger and fluidly coupled to one of the at least one second heat source exchanger.

The thermal management system of any preceding clause, wherein the first heat sink exchanger and the second heat sink exchanger are physically separate heat sink exchangers.

The thermal management system of any preceding clause, wherein the first heat source exchanger and the second heat source exchanger share a common heat source exchanger structure, wherein the first flow loop is fluidly isolated from the second flow loop in the common heat source exchanger structure.

The thermal management system of any preceding clause, wherein the first heat source exchanger and the second heat source exchanger are configured for selective activation in the thermal transport bus, and the first heat sink exchanger and the second heat sink exchanger are configured for selective activation in the thermal transport bus.

The thermal management system of any preceding clause, wherein the first pump is configured as a first compressor, wherein the second pump is configured as a second compressor, wherein first flow loop further comprises a first expansion device, and wherein the second flow loop further comprises a second expansion device.

The thermal management system of any preceding clause, further comprising a plurality of the common heat sources, wherein each of the common heat sources comprises one of the first heat sink exchangers configured therewith.

The thermal management system of any preceding clause, wherein the common heat sources comprise any combination of an environmental control system, a main lubrication system, an electric machine thermal system, an electronics cooling system, a compressor cooling air system heat, or an active clearance control system.

A gas turbine engine comprising: a heat source; a thermal management system, the thermal management system further comprising a thermal transport bus having a heat exchange fluid flowing therethrough, the thermal transport bus comprising: a first flow loop comprising at least one first heat source exchanger, at least one first heat sink exchanger, and a first pump to move the heat exchange fluid through the first flow loop; a second flow loop comprising at least one second heat source exchanger, at least one second heat sink exchanger, and a second pump to move the heat exchange fluid through the second flow loop; wherein the first flow loop is isolated from the second flow loop, and wherein the first heat source exchanger and the second heat source exchanger are configured with the heat source of the gas turbine engine.

The gas turbine engine of any preceding clause, wherein the heat exchange fluid moving through the first flow loop does not mix with the heat exchange fluid moving through the second flow loop, and wherein the first flow loop and the second flow loop provide redundant and isolated heat removal capacity to the heat source.

The gas turbine engine of any preceding clause, further comprising: a compressor section coupled to a turbine section by one or more shafts, wherein the heat source is a main lubrication system for providing lubrication to one or more components located in at least one of the compressor section or the turbine section.

The gas turbine engine of any preceding clause, wherein the first heat source exchanger and the second heat source exchanger are physically separate heat exchangers configured with the heat source.

The gas turbine engine of any preceding clause, wherein the common heat source comprises a bleed port fluidly coupled to one of the at least one first heat source exchanger and fluidly coupled to one of the at least one second heat source exchanger.

The gas turbine engine of any preceding clause, wherein the first heat source exchanger and the second heat source exchanger are configured for selective activation in the thermal transport bus, and the first heat sink exchanger and the second heat sink exchanger are configured for selective activation in the thermal transport bus.

A method of operating a thermal management system of a gas turbine engine, the thermal management system comprising a thermal transport bus having a first flow loop, a second flow loop, and a heat exchange fluid flowing therethrough, the method comprising: receiving data indicative of a flow parameter of the heat exchange fluid through the first flow loop, the second flow loop, or both; and modifying a ratio of heat transferred from a common heat source to the first flow loop relative to heat transferred from the common heat source to the second flow loop in response to the received data indicative of the flow parameter of the heat exchange fluid through the first flow loop, the second flow loop, or both.

The method of any preceding clause, wherein receiving data indicative of the flow parameter of the heat exchange fluid through the first flow loop, the second flow loop, or both comprises receiving data indicative of a fault associated with the first flow loop.

The method of any preceding clause, wherein modifying the ratio of heat transferred from the common heat source to the first flow loop relative to heat transferred from the common heat source to the second flow loop comprises bypassing a first heat source exchanger of the first flow loop.

The method of any preceding clause, wherein receiving data indicative of the fault associated with the first flow loop comprises receiving data indicative of: a temperature of the heat exchange fluid through the first flow loop being above a predetermined temperature threshold, a pressure of the heat exchange fluid through the first flow loop being below a predetermined pressure threshold, a temperature rise across a first heat sink exchanger of the first flow loop being outside a predetermined temperature range, a pressure rise across the first heat sink exchanger of the first flow loop being outside a predetermined pressure range, or a combination thereof.

What is claimed is:

1. A thermal management system for incorporation into at least one of a gas turbine engine or an aircraft, comprising:
   a thermal transport bus having a heat exchange fluid flowing therethrough, the thermal transport bus further comprising:
     a first flow loop comprising at least one first heat source exchanger, at least one first heat sink exchanger, and a first pump to move the heat exchange fluid through the first flow loop; and
     a second flow loop comprising at least one second heat source exchanger, at least one second heat sink exchanger, and a second pump to move the heat exchange fluid through the second flow loop,
   wherein the first flow loop is isolated from the second flow loop,
   wherein the first heat source exchanger and the second heat source exchanger are configured with a common heat source,
   wherein the first heat source exchanger and the second heat source exchanger are physically separate heat exchangers configured in parallel with the common heat source, and
   wherein the common heat source comprises a bleed port fluidly coupled to one of the at least one first heat source exchanger and fluidly coupled to one of the at least one second heat source exchanger.

2. The thermal management system of claim 1,
   wherein the heat exchange fluid moving through the first flow loop does not mix with the heat exchange fluid moving through the second flow loop, and
   wherein the first flow loop and the second flow loop provide redundant and isolated heat removal capacity to the common heat source.

3. The thermal management system of claim 1,
   wherein the first heat source exchanger and the second heat source exchanger share a common heat source exchanger structure,
   wherein the first flow loop is fluidly isolated from the second flow loop in the common heat source exchanger structure.

4. The thermal management system of claim 1, wherein the first heat source exchanger and the second heat source exchanger are configured for selective activation in the thermal transport bus, and the first heat sink exchanger and the second heat sink exchanger are configured for selective activation in the thermal transport bus.

5. The thermal management system of claim 1, further comprising
   a plurality of the common heat sources,
   wherein each of the common heat sources comprises one of the first heat sink exchangers configured therewith.

6. A thermal management system for incorporation into at least one of a gas turbine engine or an aircraft, comprising:
   a thermal transport bus having a heat exchange fluid flowing therethrough, the thermal transport bus further comprising:
     a first flow loop comprising at least one first heat source exchanger, at least one first heat sink exchanger, and a first pump to move the heat exchange fluid through the first flow loop; and
     a second flow loop comprising at least one second heat source exchanger, at least one second heat sink exchanger, and a second pump to move the heat exchange fluid through the second flow loop,
   wherein the first flow loop is isolated from the second flow loop,
   wherein the first heat source exchanger and the second heat source exchanger are configured with a common heat source,
   wherein the first pump is configured as a first compressor,
   wherein the second pump is configured as a second compressor,
   wherein first flow loop further comprises a first expansion device, and
   wherein the second flow loop further comprises a second expansion device.

7. The thermal management system of claim 6, wherein the first heat source exchanger and the second heat source exchanger are physically separate heat exchangers configured in parallel with the common heat source.

8. The thermal management system of claim 7, wherein the common heat source comprises a bleed port fluidly coupled to one of the at least one first heat source exchanger and fluidly coupled to one of the at least one second heat source exchanger.

9. The thermal management system of claim 6, wherein the first heat sink exchanger and the second heat sink exchanger are physically separate heat sink exchangers.

10. The thermal management system of claim 6, wherein the common heat sources comprise any combination of an environmental control system, a main lubrication system, a electric machine thermal system, an electronics cooling system, a compressor cooling air system heat, or an active clearance control system.

11. A gas turbine engine comprising:
a heat source;
a thermal management system, the thermal management system further comprising a thermal transport bus having a heat exchange fluid flowing therethrough, the thermal transport bus comprising:
a first flow loop comprising at least one first heat source exchanger, at least one first heat sink exchanger, and a first pump to move the heat exchange fluid through the first flow loop;
a second flow loop comprising at least one second heat source exchanger, at least one second heat sink exchanger, and a second pump to move the heat exchange fluid through the second flow loop,
wherein the first flow loop is isolated from the second flow loop, and
wherein the first heat source exchanger and the second heat source exchanger are configured with the heat source of the gas turbine engine,
wherein the common heat source comprises a bleed port fluidly coupled to one of the at least one first heat source exchanger and fluidly coupled to one of the at least one second heat source exchanger.

12. The gas turbine engine of claim 11,
wherein the heat exchange fluid moving through the first flow loop does not mix with the heat exchange fluid moving through the second flow loop, and
wherein the first flow loop and the second flow loop provide redundant and isolated heat removal capacity to the heat source.

13. The gas turbine engine of claim 11, further comprising:
a compressor section coupled to a turbine section by one or more shafts,
wherein the heat source is a main lubrication system for providing lubrication to one or more components located in at least one of the compressor section or the turbine section.

14. The gas turbine engine of claim 11, wherein the first heat source exchanger and the second heat source exchanger are physically separate heat exchangers configured with the heat source.

15. The gas turbine engine of claim 11, wherein the first heat source exchanger and the second heat source exchanger are configured for selective activation in the thermal transport bus, and the first heat sink exchanger and the second heat sink exchanger are configured for selective activation in the thermal transport bus.

16. A method of operating a thermal management system of a gas turbine engine, the thermal management system comprising a thermal transport bus having a first flow loop, a second flow loop, and a heat exchange fluid flowing therethrough, the method comprising:
receiving data indicative of a flow parameter of the heat exchange fluid through the first flow loop, the second flow loop, or both; and
modifying a ratio of heat transferred from a common heat source to the first flow loop relative to heat transferred from the common heat source to the second flow loop in response to the received data indicative of the flow parameter of the heat exchange fluid through the first flow loop, the second flow loop, or both,
wherein the common heat source comprises a bleed port fluidly coupled to one of at least one first heat source exchanger disposed in the first flow loop and fluidly coupled to one of at least one second heat source exchanger disposed in the second flow loop.

17. The method of claim 16, wherein receiving data indicative of the flow parameter of the heat exchange fluid through the first flow loop, the second flow loop, or both comprises receiving data indicative of a fault associated with the first flow loop.

18. The method of claim 17, wherein modifying the ratio of heat transferred from the common heat source to the first flow loop relative to heat transferred from the common heat source to the second flow loop comprises bypassing a first heat source exchanger of the first flow loop.

19. The method of claim 17, wherein receiving data indicative of the fault associated with the first flow loop comprises receiving data indicative of:
a temperature of the heat exchange fluid through the first flow loop being above a predetermined temperature threshold, a pressure of the heat exchange fluid through the first flow loop being below a predetermined pressure threshold, a temperature rise across a first heat sink exchanger of the first flow loop being outside a predetermined temperature range, a pressure rise across the first heat sink exchanger of the first flow loop being outside a predetermined pressure range, or a combination thereof.

* * * * *